May 14, 1946.  W. L. CARLSON ET AL  2,400,189
MEASURING THE VELOCITY OF BULLETS
Filed May 25, 1944  2 Sheets-Sheet 1
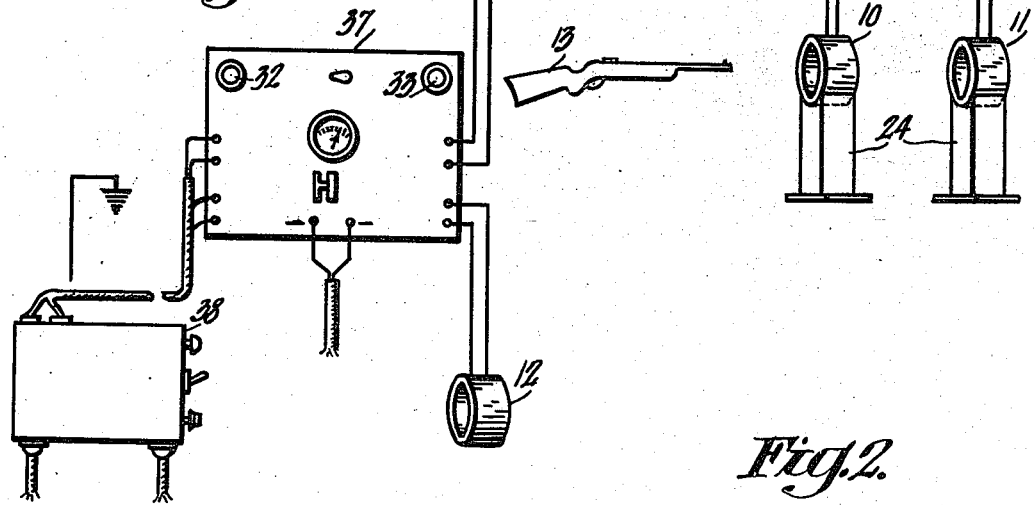
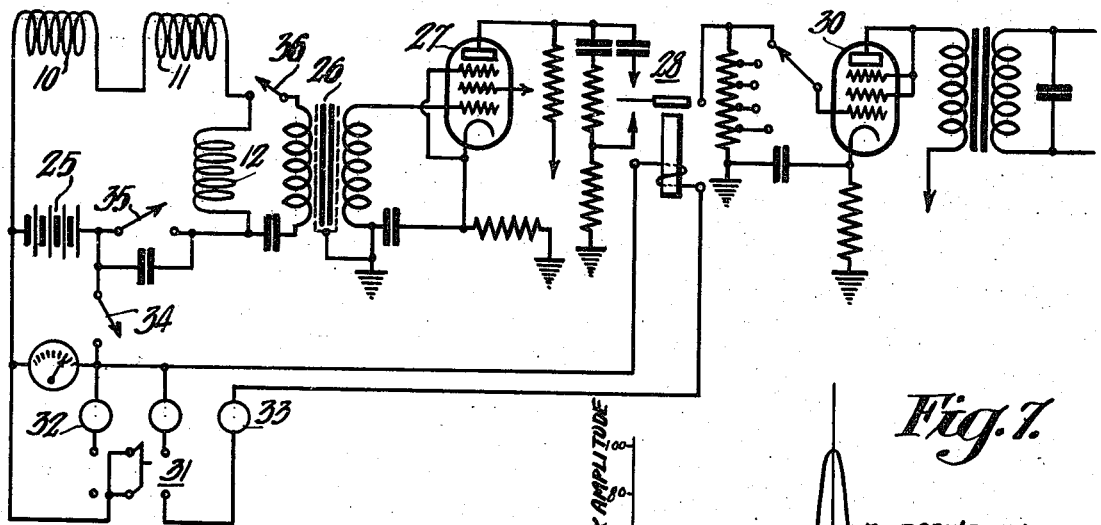
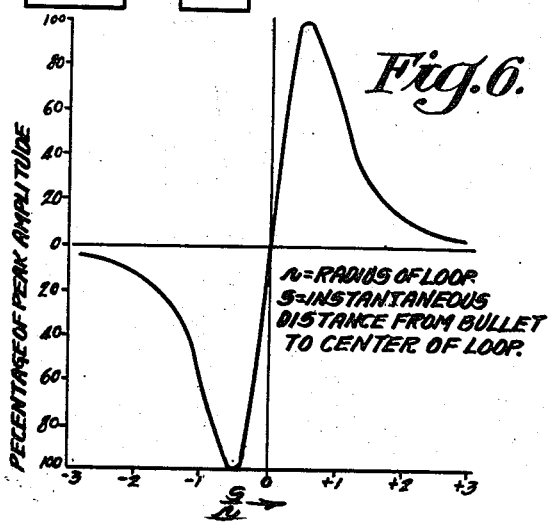
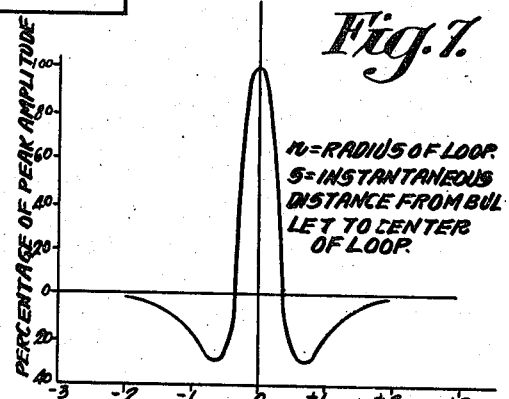
INVENTORS
Wendell L. Carlson
Vernon D. Landon
& Robert L. Harvey
BY
ATTORNEY

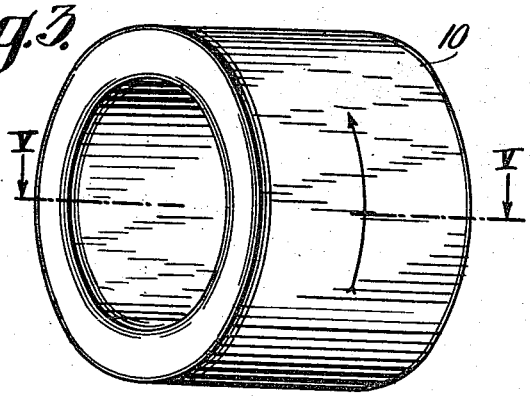
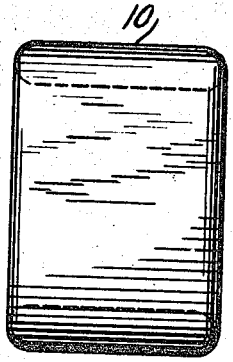
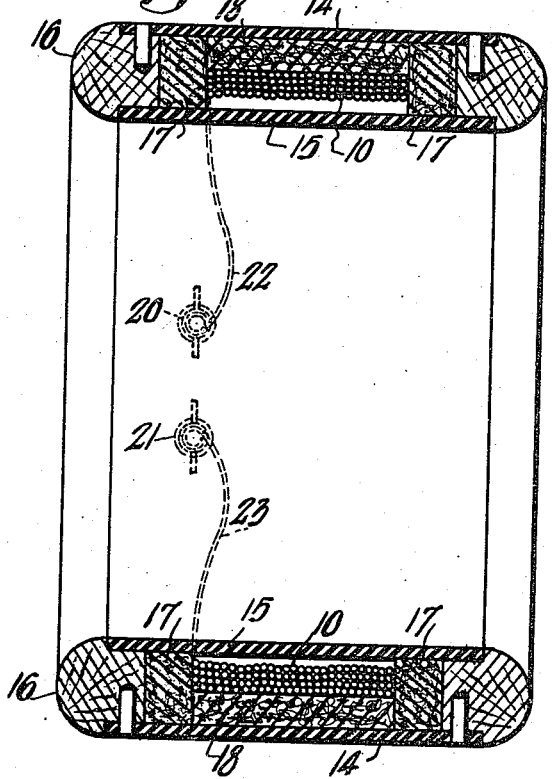
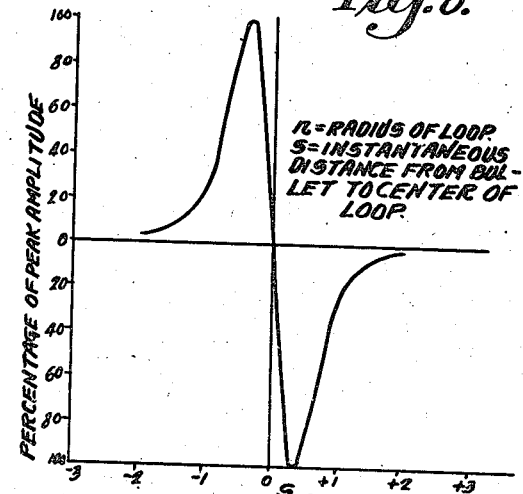
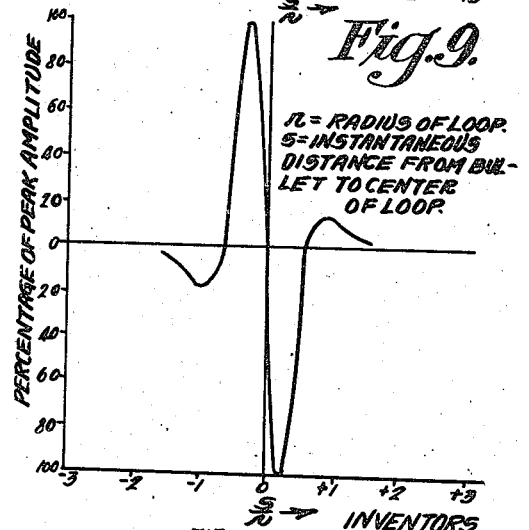

Patented May 14, 1946

2,400,189

UNITED STATES PATENT OFFICE 2,400,189

MEASURING THE VELOCITY OF BULLETS

Wendell L. Carlson, Vernon D. Landon, and Robert L. Harvey, Princeton, N. J., assignors to Radio Corporation of America, a corporation of Delaware Application May 25, 1944, Serial No. 537,304

15 Claims. (Cl. 161—18)

The present invention relates to the generation of electrical impulses and more particularly to such impulses caused by the flight of a bullet.

Some of the objects of the present invention are: to provide a novel system for measuring the velocity of bullets; to provide a velocity measuring system wherein the motion of a bullet through a magnetic field generates an electrical impulse capable of being used as a measure of the velocity of the bullet; to provide a velocity measuring system wherein a loop energized by a direct current is responsive to a bullet traversing the loop to create an impulse usable with other adjuncts of the system to measure the velocity of the bullet; to provide a multiple turn loop forming a path for a bullet, which loop has a length approximately equal to its mean radius; to provide a velocity measuring system wherein a plurality of loops are provided for the successive passage of a bullet in flight, each loop having an impulse generated therein as the bullet passes so that a time factor is obtained as a measure of the velocity of the bullet; to provide a system for measuring the velocity of bullets wherein the loops are employed for successively responding to the passage of a bullet plus suitable amplifier circuits furnishing an output to an impulse counter; to provide a system for measuring velocity of bullets wherein loop and amplifier circuits are employed responsive to either magnetic or non-magnetic bullets, plus provision for changing circuits for operation with the type of bullet under consideration; to provide a system for measuring the velocity of bullets wherein electrical circuits are protected from high induction voltage; to provide a system for measuring the velocity of bullets wherein provision is made for sound proofing the apparatus to obviate errors otherwise due to vibrations incident to firing the gun or otherwise; to provide a system for measuring the velocity of bullets wherein loop input and amplifier circuits including three impulse responsive loops are employed, two of which are alined in the path of the bullet and the third coupled to the amplifier circuit; to provide a device for measuring bullet velocity in which are combined a large orifice to make it easy to shoot through and in which acoustic shielding prevents microphonics; and to provide other improvements as will hereinafter appear.

In the accompanying drawings, Figure 1 represents a diagram of the system of the present invention as assembled for operation; Figure 2 represents one form of circuit embodying the invention; Figure 3 represents a perspective of one of the loops as mounted for operation; Figure 4 represents an end elevation of any one of the loops; Figure 5 represents a section on line V—V of Fig. 3; Figure 6 is a graph representing the theoretical curve of the current induced in a non-magnetic bullet; Figure 7 is a graph representing the theoretical voltage induced in a loop by a non-magnetic bullet; Figure 8 is a graph representing the theoretical response for non-magnetic bullet after differentiation; and Figure 9 is a graph representing the theoretical loop voltage for a magnetic bullet not permanently magnetized.

Referring to the drawings, one form of the present invention comprises three loops 10, 11 and 12, two of which, 10 and 11, are arranged in spaced coaxial relation and encircle the path of a bullet fired from a gun 13. The third loop 12 serves as a coupling coil for transmitting the induced pulse to a suitable circuit for amplification to a value capable of actuating an electronic counter or other electrical responsive device. In the present instance, all of the loops are wound, dimensioned and constructed alike, though this is only a requirement as to the loops 10 and 11, as it is unnecessary that loop 12 so conform since other coupling means may be employed. Thus, each loop consists of a four-layer coil, five inches long and is wound of No. 10 double cotton covered wire. The shape of the winding is maintained by impregnating the coil with heavy wax so that it has the conformation of a hollow cylinder.

For protecting and sound proofing the loop coils, each is housed by two coaxial tubes of insulating material 14 and 15, having ends closed by wooden rings 16 connected to the cardboard thereby to form a sealed housing around the coil. As a support for the coil a plurality of felt rings 17, such as "Ozite" encircle the coil within the rings 16, while a felt ring 18 encircles the outer face of the coil to fill the space between this face and the inner wall of the outer tube 14. It should be particularly noted that the inner face of the coil is spaced from the inner tube 15 to form an annular air chamber which insulates the coil from sound vibrations. Thus, by acoustically shielding the coil, the microphonic response of the loop is reduced to a minimum. Two relatively heavy terminals 20 and 21 are secured to the outer tube 14, and are respectively connected by flexible conductors 22 and 23 to the ends of the coil.

The ratio of coil diameter and sound proof housing inner diameter should be as near unity as practical so as to provide a large area for the passage of the bullet. Therefore, the coil is supported mainly, from its outer surface through thick sound absorbing material. The air space between the inner surface of the coil and the housing should be reduced to a minimum determined by mechanical clearances.

In order to provide a substantially uniform magnetic field within the coil and, therefore, a uniform response from bullets passing through the center or off to one side of center, we find that the coil width should be approximately the same dimension as the coil radius. Also, we find that this construction minimizes self-induced voltages set up in the coil due to vibration. If the coil turns are concentrated, i. e., more layers and fewer turns per layer, the magnetic field will be less uniform, and the microphonics will be increased.

It is important that the electrical center of each coil be accurately located and this point is obtained in the following manner. The three loops are coaxially located on a wooden rack with a spacing of about eighteen inches between the loops. The two outer loops are connected in series, bucking and across an audio signal generator. The middle loop is connected to the input of an audio amplifier (that shown in Fig. 2 may be used) and the output of the amplifier is connected to an audio indicating device. With about 2000-cycle output from the generator, one of the end loops is adjusted laterally to obtain a good null. From a fixed pointer, situated near the center of the loop under test, a line is marked on the loop housing. Now, without moving the pointer or other coils, the marked coil is rotated through 180 degrees, the leads reversed, another null obtained, and a second mark made on the coil housing. Equi-distant between these two marks is the electrical center of the coil. This is marked by an arrow as shown on Fig. 3.

For mounting the loops, each coil assembly includes a support 24 in the form of a sturdy wooden rack built entirely of non-metallic material. Thus, all parts of the support 24 are held together by waterproof glue and dowels. Finally, the support is waterproof-treated and finished a dull black to present a contrast to the bright yellow loop housing. Preferably, rubber pads form a bearing for the loop housing and the weight of the loop will be sufficient to hold it in place. Should the weight be found insufficient, suitable non-metallic means can be wrapped around the housing and support for greater mechanical stability. From the foregoing it will be seen that there are three independent supports with coil housings respectively thereon, two of which are to be installed on the firing range in proper position while the third is located in the gun room near the control panel.

Referring to Figs. 1 and 2, the loops 10, 11 and 12 are in a series circuit supplied with current from a source 25, in this instance a storage battery, and the loops 10 and 11 are coaxially alined in spaced relation, while the loop 12 is in coupling relation with an input transformer 26 as a step-up means to the grid of the first amplifier tube 27. This tube 27 is preferably one which is free from microphonic disturbance and its anode works into a network which is arranged to be switched by means of a relay 28 from a differentiating circuit for non-magnetic bullets to a low gain amplifier circuit for magnetic bullets.

The differentiating part of the circuit consists of the capacitor $C_x$ and the resistor $R_x$. Over a range of frequencies containing the pulse components, the reactance of $C_x$ is much larger than the resistance of $R_x$. Thus the current is almost entirely a function of $C_x$. This current is proportional to the rate of change of the signal voltage. Hence, output is the derivative of the input voltage. The gain is adjusted by proper circuit constants so that the output, when using standard 0.30 calibre magnetic or non-magnetic ammunition, will be constant. A five-step volume control circuit with a total range of 100 to 1 follows the switching circuit and feeds the grid of the second amplifier tube 30. The anode circuit of the tube 30 consists of an output transformer, the secondary of which is designed to work into a balanced load of 2000 ohms with the center grounded. The entire amplifier has, essentially, a flat response from 100 to 10,000 cycles. The relay 28 is energized or deenergized according to the position of a control switch 31 and indication of which relay circuit has been selected is evidenced by a red pilot lamp 32 in one circuit and a green pilot lamp 33 in the other circuit. A switch 34 controls current to the indicating lamps and the relay, while a switch 35 controls current from the source 25 to the loops. The coupling circuit also includes a switch 36 which when open prevents high voltage surge from the loop circuit from damaging the transformer. Thus, while all switches are closed when the system is operating, the switch 36 is closed last when starting operation and is opened first when stopping operation. As shown in Fig. 1, the loop circuits, battery, relay, and output, are associated with a control panel 37 having the indicating lamps 32 and 33 visible thereon as well as a voltmeter and control switches. The output from the panel leads to the amplifier which is housed in a cabinet 38 along with the power supply from a suitable A.—C. source.

In operation the loops 10 and 11 are located on the range where they are carefully adjusted for the distance between them, namely by measuring from black arrow on one loop housing to the black arrow on the other loop housing. These arrows indicate the electrical center of the loops. With all circuits closed, a bullet is fired through the two coaxial loops 10 and 11, thereby cutting the D.—C. magnetic fields of the energized loops, producing eddy currents in the bullet which induce a voltage pulse in each loop. Since the loops are spaced a measured and known distance apart, the velocity of the bullet can now be calculated using the time interval between pulses as a measure.

All calculations are based upon the mutual inductance between the bullet and the loop as a function of the time or distance. In these calculations solutions for pulse shapes are required for non-magnetic and for magnetic bullets with and without pre-magnetization. The bullets available for trial were all 0.30 calibre and include the copper-jacketed, lead-core bullet; the steel-jacketed, lead-core bullet; and the armor piercing bullet which has a hardened steel core and a copper jacket. The approximate solutions for the pulse shapes for the various bullets have been found and have been checked by taking oscillograms. The theoretical pulses were found to correspond quite closely to the actual pulses. Thus, in Fig. 7 the theoretical curve of the current induced in the non-magnetic bullet is shown, while Fig. 8 shows the curve of the theoretical loop voltage for the non-magnetic bullet.

We claim as our invention:

1. An apparatus for measuring the velocity of bullets, comprising two loops arranged in coaxial spaced relation to form a path for a bullet, each loop being formed by a multiple turn coil of wire, means providing an acoustic shielding for each loop, said shielding means forming an annular air space encircled by its loop, means for energizing said loops to create a magnetic field in each, and means responsive to an electrical pulse generated in each loop by the passage of a bullet through the coil magnetic field for indicating the presence of said bullet, whereby the successive pulses produce a time interval from which the velocity of the bullet can be calculated.

2. An apparatus for measuring the velocity of bullets, comprising two loops arranged in coaxial spaced relation to form a path for a bullet, each loop being formed by a multiple turn coil of wire, means for energizing said loops to create a magnetic field in each, an audio amplifier, means responsive to an electrical pulse generated in each loop by the passage of a bullet through the loop magnetic field for indicating the presence of said bullet, whereby the successive pulses produce a time interval from which the velocity of the bullet can be computed, means coupling said responsive means to said audio amplifier, and means to prevent high induction voltage surge in said coupling means during the initial functioning of said energizing means.

3. An apparatus for measuring the velocity of bullets, comprising two loops arranged in coaxial spaced relation to form a path for a bullet, each loop being formed by a multiple turn coil of wire, means for energizing said loops to create a magnetic field in each, an audio amplifier, means responsive to an electrical pulse generated in each loop by the passage of a bullet through the loop magnetic field for indicating the presence of said bullet, whereby the successive pulses produce a time interval from which the velocity of the bullet can be computed, means coupling said responsive means to said audio amplifier, and means rendering said coupling means ineffective during the initial functioning of said energizing means.

4. An apparatus for measuring the velocity of bullets, comprising two loops arranged in coaxial spaced relation to form a path for a bullet, each loop being formed by a multiple turn coil of wire, means providing an acoustic shielding for each loop, said shielding means forming an annular air space encircled by its loop, means for energizing said loops to create a magnetic field in each, an audio amplifier, means responsive to an electrical pulse generated in each loop by the passage of a bullet through the loop magnetic field for indicating the presence of said bullet, whereby the successive pulses produce a time interval from which the velocity of the bullet can be computed, and means coupling said responsive means to said audio amplifier.

5. An apparatus for measuring the velocity of bullets, comprising two loops arranged in coaxial spaced relation to form a path for a bullet, each loop being formed by a multiple turn coil of wire, means providing an acoustic shielding for each loop, said shielding means forming an annular air space encircled by its loop, means for energizing said loops to create a magnetic field in each, an audio amplifier, means responsive to an electrical pulse generated in each loop by the passage of a bullet through the loop magnetic field for indicating the presence of said bullet, whereby the successive pulses produce a time interval from which the velocity of the bullet can be computed, means coupling said responsive means to said audio amplifier, and means to prevent high induction voltage surge in said coupling means during the initial functioning of said energizing means.

6. An apparatus for measuring the velocity of bullets, comprising two loops arranged in coaxial spaced relation to form a path for a bullet, each loop being formed by a multiple turn coil of wire, means providing an acoustic shielding for each loop, said shielding means forming an annular air space encircled by its loop, means for energizing said loops to create a magnetic field in each, an audio amplifier, means responsive to an electrical pulse generated in each loop by the passage of a bullet through the loop magnetic field for indicating the presence of said bullet, whereby the successive pulses produce a time interval from which the velocity of the bullet can be computed, means coupling said responsive means to said audio amplifier, and means rendering said coupling means ineffective during the initial functioning of said energizing means.

7. In an apparatus for measuring the velocity of bullets, comprising two loops arranged in coaxial spaced relation to form a path for a bullet, each loop being formed as a multiple turn loop having a length approximately equal to its mean radius, means providing an acoustic shielding for each loop, said shielding means forming an annular air space encircled by its loop, means for energizing said loop to create a magnetic field in each, and means responsive to an electrical impulse generated in each loop by the passage of a bullet through the loop magnetic field for indicating the presence of said bullet, whereby the successive pulses produce a time interval from which the velocity of the bullet can be calculated.

8. In an apparatus for measuring the velocity of bullets, comprising two loops arranged in coaxial spaced relation to form a path for a bullet, each loop being formed as a multiple turn loop, direct current means for energizing said loops to create a magnetic field in each, means comprising an audio amplifier and a coupling loop responsive to an electrical impulse generated in each alined loop by the passage of a bullet through the loop magnetic field for indicating the presence of said bullet, whereby the successive pulses produce a time interval from which the velocity of the bullet can be calculated.

9. In an apparatus for measuring the velocity of bullets, comprising two loops arranged in coaxial spaced relation to form a path for a bullet, means comprising a coupling loop responsive to an electrical impulse generated in each alined loop by the passage of a bullet through the loop magnetic field for indicating the presence of a bullet, whereby the successive pulses produce a time interval from which the velocity of the bullet can be calculated, two electrical circuits constituting an audio amplifier and energized by said coupling means, one of said circuits functioning for non-magnetic bullets and the other functioning for magnetic bullets, and means for selecting the circuit corresponding to the bullet used.

10. In an apparatus for measuring the velocity of a bullet, a loop formed by a multiple turn coil, a shield enclosing said loop to absorb sound waves, said shield forming an annular space on one side of said coil and on the other side a through hole for the passage of a bullet, and terminals leading from the coil to the exterior of said shield.

11. In an apparatus for measuring the velocity of a bullet, a cylindrical loop formed by a multiple turn coil having a length approximately equal to its mean radius and forming an annular space on its outer side with the inner periphery of said loop and on its inner face a through hole for the passage of a bullet, a sound proof housing about said coil, and terminals leading from said coil to the exerior of said housing.

12. A device as in claim 9 in which the audio amplifier circuit used for non-magnetic bullets differs from that used for magnetic bullets by the inclusion of a differentiating circuit.

13. In an apparatus for measuring the velocity of a bullet, a loop formed by a multiple turn coil, an enclosure of sound-deadening material about the outer periphery of said loop, a tube of insulating material encircling said material, a tube of insulating material spaced from said coil to form an air space at one side and a through hole at the other side for the passage of a bullet, and two non-magnetic coverings respectively closing the end spaces of said tubes.

14. In an apparatus for measuring the velocity of a bullet, a cylindrical loop formed by a multiple turn coil, a ring of sound-deadening material about the outer periphery of said loop, a tube of insulating material encircling said material, a tube of insulating material spaced circumferentially from said coil to form an air space at one side and a through hole at the other side for the passage of a bullet, two non-magnetic rings respectively closing the end spaces of said tubes, and sound-deadening rings respectively between said coil and said non-magnetic rings.

15. In an apparatus for measuring the velocity of a bullet, a cylindrical loop formed by a multiple turn coil having a length approximately equal to its mean radius, a ring of sound-deadening material about the outer periphery of said loop, a tube of insulating material encircling said material, a tube of insulating material spaced circumferentially from said coil to form an air space at one side and a through hole at the other side for the passage of a bullet, and two non-magnetic rings respectively closing the end spaces of said tubes.

WENDELL L. CARLSON.
VERNON D. LANDON.
ROBERT L. HARVEY.